(12) United States Patent
Hall

(10) Patent No.: US 9,626,800 B2
(45) Date of Patent: Apr. 18, 2017

(54) APPARATUS AND METHOD FOR AUGMENTED REALITY

(71) Applicant: Sony Computer Entertainment Europe Limited, London (GB)

(72) Inventor: Simon John Hall, London (GB)

(73) Assignee: Sony Computer Entertainment Europe Limited (GB)

( * ) Notice: Subject to any disclaimer, the term of this patent is extended or adjusted under 35 U.S.C. 154(b) by 473 days.

(21) Appl. No.: 14/066,946

(22) Filed: Oct. 30, 2013

(65) Prior Publication Data

US 2014/0118398 A1    May 1, 2014

(30) Foreign Application Priority Data

Oct. 31, 2012  (GB) .................................. 1219584.8

(51) Int. Cl.
*G09G 5/00*      (2006.01)
*G06K 9/46*      (2006.01)
*G06T 19/00*     (2011.01)
*G06T 9/00*      (2006.01)
*H04N 19/167*    (2014.01)

(52) U.S. Cl.
CPC .............. *G06T 19/006* (2013.01); *G06T 9/00* (2013.01); *H04N 19/167* (2014.11)

(58) Field of Classification Search
None
See application file for complete search history.

(56) References Cited

U.S. PATENT DOCUMENTS

| | | | |
|---|---|---|---|
| 2003/0174773 A1* | 9/2003 | Comaniciu | H04N 19/23 375/240.08 |
| 2006/0204057 A1 | 9/2006 | Steinberg | |
| 2009/0298517 A1 | 12/2009 | Freer | |
| 2011/0063295 A1* | 3/2011 | Kuo | G06T 15/50 345/426 |
| 2011/0134108 A1 | 6/2011 | Hertenstein | |
| 2011/0254950 A1* | 10/2011 | Bibby | G06T 7/0081 348/135 |

(Continued)

OTHER PUBLICATIONS

British Search and Examination Report for Application No. GB1219584.8 dated May 3, 2013.

*Primary Examiner* — William Beutel
(74) *Attorney, Agent, or Firm* — Lerner, David, Littenberg, Krumholz & Mentlik, LLP

(57) ABSTRACT

A portable electronic device comprises a video camera for capturing a sequence of video images and an image processor operable to compress a first region of a current video image to a first extent and a second region of the current video image to a second, greater, extent to generate a processed current video image. The device includes a network communications interface operable to send processed video images to a server, and to receive control data from the server. The image processor is operable to augment the current video image with one or more computer graphic elements. Control data received from the server comprises image region information indicating a region of a video image estimated to comprise a predetermined marker and optionally augmentation instructions. Furthermore, the image processor is operable to define the first region of the current video image responsive to the image region information from the server.

11 Claims, 8 Drawing Sheets

(56) References Cited

U.S. PATENT DOCUMENTS

| | | | |
|---|---|---|---|
| 2012/0054337 A1* | 3/2012 | Moritz | H04W 4/02 |
| | | | 709/224 |
| 2012/0244939 A1 | 9/2012 | Braun | |
| 2013/0107038 A1* | 5/2013 | Ota | G01C 21/20 |
| | | | 348/135 |
| 2013/0177203 A1* | 7/2013 | Koo | G06K 9/00671 |
| | | | 382/103 |

* cited by examiner

APPARATUS AND METHOD FOR AUGMENTED REALITY

CROSS REFERENCE TO RELATED APPLICATIONS

The present application claims the benefit of and priority to GB Application No. 1219584.8, filed Oct. 31, 2012, the entire disclosure of which is incorporated by reference herein.

BACKGROUND OF THE INVENTION

Field of the Invention

The present invention relates to an apparatus and method for augmented reality.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Augmented reality games are becoming ever more popular, with examples including Invizimals® for the Sony® PlayStation Portable® (or PSP®), and for the PS Vita®. Such games use a camera operably coupled to the portable device (or built-in) to capture video images of the environment and identify so-called fiduciary markers. An example of a fiduciary marker 800 is shown in FIG. 1.

Such a fiduciary marker typically has a high contrast pattern within a clearly defined border or comprising clearly defined corner regions, and generally has no symmetry. These features allow for good recognition and determination of the fiduciary marker's position and orientation within the environment. The captured video images can then be augmented by the portable device with computer graphics that appear to integrate into the environment because they are positioned and oriented responsive to the position and orientation information determined from the fiduciary marker.

Recently, more complex augmented reality applications have also been released for the Sony PlayStation 3® or PS3®, such as the WonderBook® application, which uses a book comprising a plurality of pages upon which respective fiduciary markers are printed; this enables augmentation of the book itself in order to tell interactive stories.

It is desirable for such more complex applications to also become more portable.

The present invention attempts to address or mitigate this desire.

SUMMARY OF THE INVENTION

In a first aspect, a portable electronic device is provided in accordance with claim 1.

In another aspect, a server is provided in accordance with claim 8.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

An apparatus and method for augmented reality are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

A smartphone, personal digital assistant, portable gaming device or similar portable electronic device (PED) capable of capturing video images and having a wireless network connection (e.g. WiFi®, 3G® or 4G®) may be adapted by suitable software instructions to operate as an augmented reality apparatus in accordance with an embodiment of the present invention.

Figure 2A:
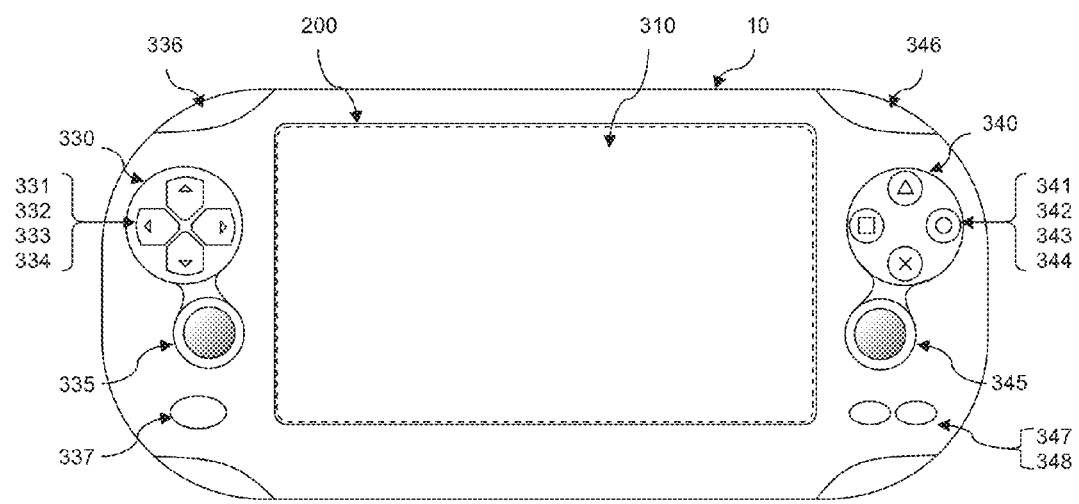
FIGS. 2A and 2B are respective schematic diagrams of the front and back of a portable electronic device in accordance with an embodiment of the present invention.
Figure 2B:
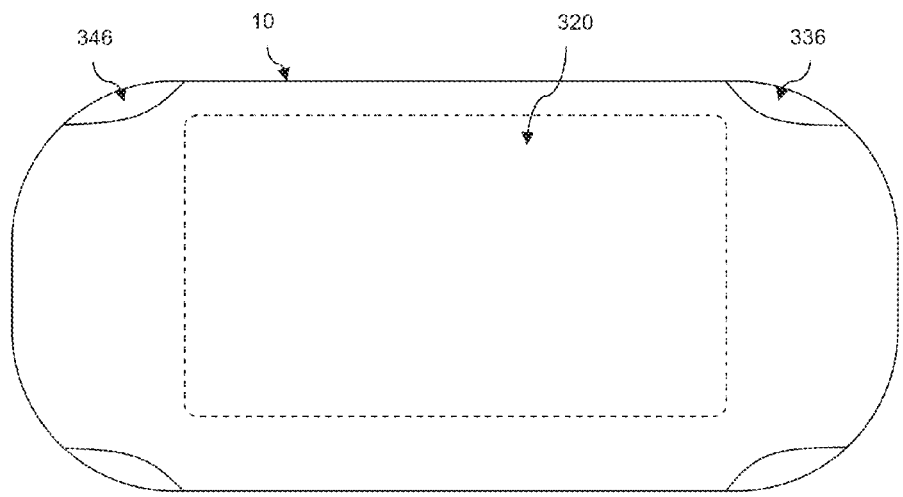

Hence referring now to FIGS. 2A and 2B, in an embodiment of the present invention the Sony PS Vita is a suitable PED.

FIGS. 2A and 2B illustrate an embodiment of a portable entertainment device (PED) 10 such as the Sony® PlayStation Vita® (PSV). FIG. 2A shows a notional front or top side of the PED, whilst FIG. 2B shows a notional rear or bottom side of the PED. The front and rear sides are substantially parallel to each other.

On the front side, the PED comprises a display 200 and optionally one or more loudspeakers (not shown).

In addition, the PED may comprise a number of physical controls. For example in FIG. 2A, a directional joypad 330 is located to the left of the display and comprises four directional buttons 331-334, and is also located adjacent a first joystick 335. In addition a shoulder button 336 is provided at the top-left of the PED. Finally, a button 337 (for example a 'PS' button) may be provided, enabling a user to access the PED's operating system at any time.

To the right of the display, a function joypad 340 comprises four function buttons 341-344. These function buttons are differentiated by their icons, such as a triangle, circle, cross and square. The function joypad is located adjacent a second joystick 345. In addition a shoulder button 346 is provided at the top-right of the PED. Finally, two buttons 347, 348 may be provided, for example providing a 'start' function and a 'select' function.

In typical use, the sets of controls on the left and right side of the PED are used co-operatively by a single user to control a game. Such a typical usage may be to control positional movement of the player within a game environment using either the directional joypad or the left joystick, whilst controlling the direction of view, or a reticule or similar, using the right joystick. Meanwhile, in-game functions just as jumping, firing a weapon, blocking an attack or interacting with an object may be assigned to respective buttons of the function joypad. Meanwhile the shoulder buttons may be used either for less frequent functions, or may be used to provide alternate modes of operation (such as primary or alternate firing modes).

The buttons of the directional joypad and the function joypad may be differently shaped, with the buttons of the directional joypad shaped in response to their respective direction, whilst the buttons of the function joypad are generally identical in shape.

In an embodiment of the present invention, the PED comprises a rear touch sensitive surface 320 (indicated by the dotted lines), having similar dimensions and aspect ratio to the display 200. The rear touch sensitive surface is positioned so as to be substantially aligned with the display on the opposite side of the device.

Meanwhile, a transparent front touch sensitive surface 310 (indicated by the dotted lines) is also provided coincident with the display 200. The front and rear touch sensitive surfaces and the display thus have similar dimensions and placements on their respective sides of the device. The touch sensitive surfaces may also have a similar resolution of touch localisation.

The rear touch sensitive surface may be a conventional capacitance touchpad or panel such as that found in laptops. Such a touchpad typically comprises two layers of parallel conductive lines separated by an insulator and arranged at right angles to each other. A high frequency signal is swept through every respective pairing of lines between the two layers. The measurable current for each pair is then proportional to the capacitance at their point of intersection. When a user's finger is placed at or near that intersection, however, some of the electrical field between layers is shunted to ground, changing the effective capacitance and hence the measured current. Precise localisation of the user's finger can be achieved by measuring changes in capacitance at nearby points of intersection, which will be proportional to their respective distances from the finger. So-called multi-touch operation of the touchpad can be achieved by detecting distinct peaks in capacitance change at separate intersection points on the touchpad. Meanwhile, movement of a user's finger or fingers can be estimated from successive points of intersection where contact is detected.

The front touch sensitive surface for use with the display operates in a similar manner to the rear touch sensitive surface, but in this instance the conductive lines are typically transparent (as a non-limiting example, being formed by a deposition of indium tin oxide), and the insulator between two layers is provided by all or part of the display window (e.g. a glass layer); typically a further transparent protective layer is then provided on top of the upper conductive layer.

It will be appreciated however that any suitable touch sensitive technique may be used for either touch panel.

Figure 3:
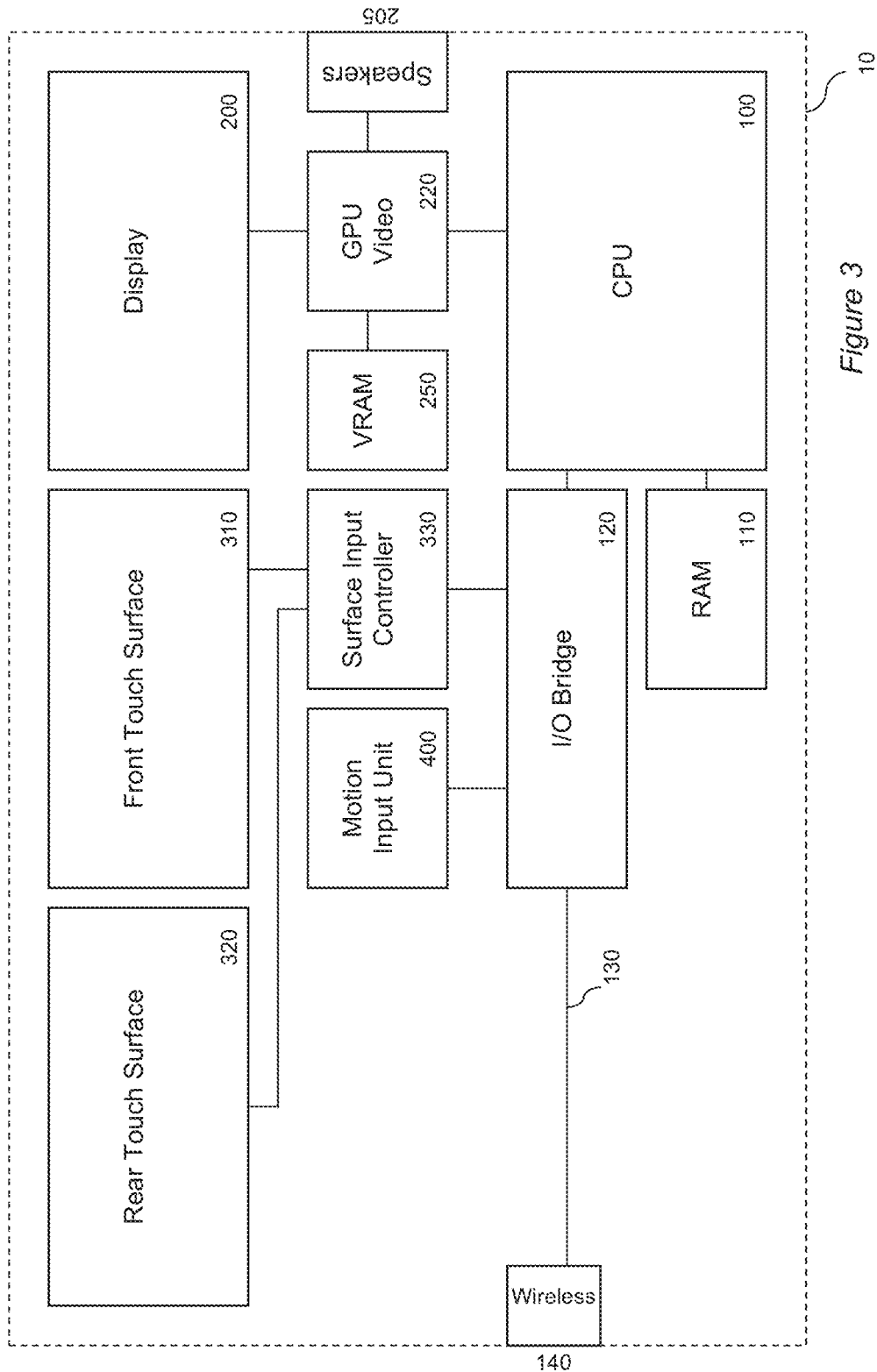
FIG. 3 is a schematic diagram of a portable electronic device in accordance with an embodiment of the present invention.

Referring now also to FIG. 3, an embodiment of the PED comprises a central processor (CPU) 100, such as the ARM® Cortex-A9 core processor, coupled to random access memory (RAM) 110 (for example 512 megabytes (MB) of RAM), and optionally to a read only memory (ROM) (not shown). In addition the CPU communicates with a graphics processing unit (GPU) 220. The GPU has access to video RAM (VRAM) 250 (for example 128 MB of VRAM). The GPU outputs video information to the display 200. The display is typically an OLED display, but may be a conventional liquid crystal display (LCD) or any suitable display technology. As a non-limiting example the display may have a resolution of 950×544 pixels. The GPU also outputs audio to loudspeakers 205 and/or to a headphone jack (not shown).

Figure 1:
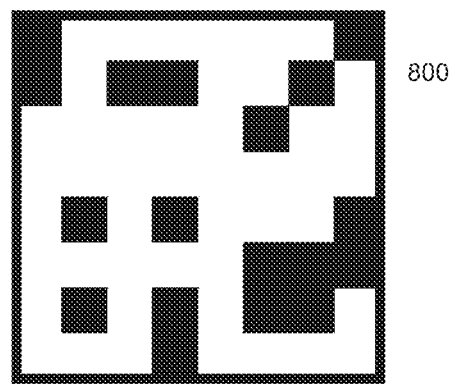
FIG. 1 is a schematic diagram of a fiduciary marker in accordance with an embodiment of the present invention.

In addition, the CPU communicates with an input/output bridge (I/O bridge) 120 that co-ordinates communication with peripheral components both integral to and linkable with the PED, such as a video camera. In an embodiment of the PED the I/O bridge 120 communicates with a surface input controller 330, which parses inputs from the rear touch sensitive surface and the transparent front touch sensitive surface where provided. The I/O bridge also communicates with an optional motion input unit 400 comprising one or more micro electromechanical (MEMs) accelerometers and/or gyroscopes, to provide up to six axes of motion input (x, y and z axis lateral movement and roll, pitch and yaw rotational movement). The I/O bridge also receives input from the physical controls (buttons and joysticks) shown in FIG. 1A, optionally via an input control logic (not shown). Finally, the I/O bridge communicates with a bus 130, upon which various peripheral devices may be linked, including one or more wireless communication units 140, such as for example 3G, WiFi (such as IEEE 802.11b/g/n), and/or Bluetooth® units.

It will be appreciated that the CPU 100 may be a single core or multi core processor, such as the ARM® Cortex-A9 core (having 4 cores). Similarly, the RAM may be dynamic RAM or may comprise both dynamic RAM and static (flash) RAM units. Likewise, whilst the GPU typically uses dedicated VRAM, alternatively or in addition it may share common RAM with the CPU. Finally, it will be appreciated that the function of the surface input unit may be performed by the CPU itself.

It will also be appreciated that whilst not shown in the figures for the purposes of clarity, the PED comprises an array of switches aligned with the buttons described previously, and also two joystick input mechanisms, each of which is able to provide input to the I/O bridge, optionally via an input control logic (not shown). Similarly not shown, the PED also comprises power distribution lines to various components and one or more sources of power, such as an input socket (for example a conventional DC power socket, or alternatively or in addition a USB socket, not shown). Such an input socket may also be used to charge one or more batteries (also not shown). Such batteries may be user removable or may be sealed in the device. Other components not shown include, for example, an optional microphone.

Figure 4:
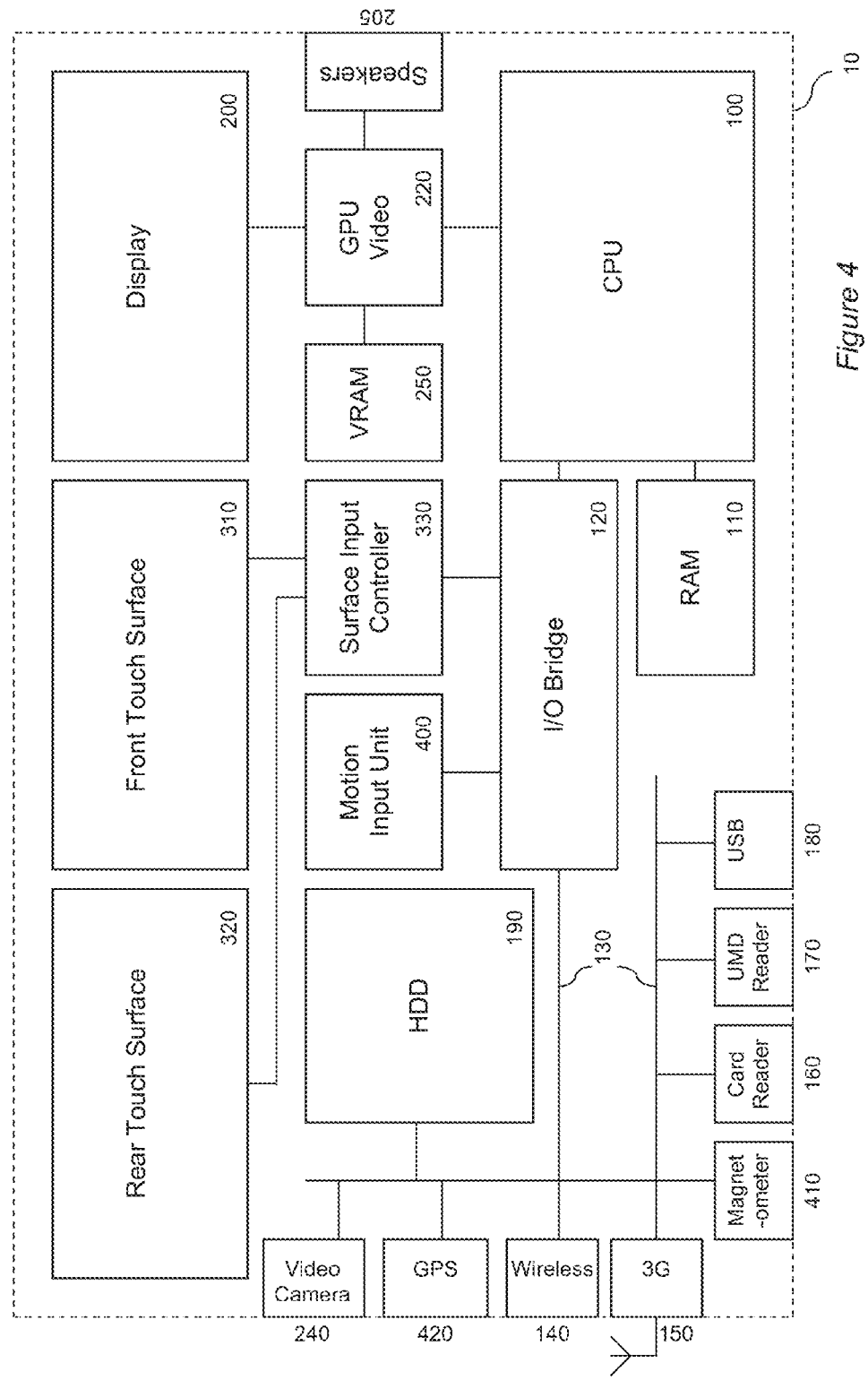
FIG. 4 is a schematic diagram of a portable electronic device in accordance with an embodiment of the present invention.

Referring now also to FIG. 4, an embodiment of the PED may comprise one or more additional components, either integrated within the device or connectable to it. The additional components include, but are not limited to, the following.

a) A card reader 160 suitable for reading from and optionally writing to memory cards, such as the Sony® Memory Stick®, or alternatively legacy memory cards such as those used by the Sony® Playstation 2® entertainment device. Such a reader may be integral to the PED or connect to the bus 130 via a USB port 180.

b) A universal media disk (UMD) reader 170 or other optical disk reader (such as DVD or Blu-Ray®), for accessing media and/or game content stored thereon. Such a reader may be removably connectable to the bus 130 via a USB port 180 or proprietary connection.

c) A magnetometer 410 for determining compass direction, mounted integral to the PED either on the bus 130 or as part of the motion input unit 400. A gravity detector (not shown) may also be included to determine the direction of gravity, either as part of the magnetometer or as a separate component.

d) A third generation (3G) or other mobile telephony and/or mobile data communication module 150. In an embodiment, the module and aerial are integral to the PED, and optionally the aerial is shared with or otherwise coupled electromagnetically with other wireless units in the device for the purpose of transmission and reception. Alternatively the module may be removably connectable to the PED, for example via a USB port 180 or a Personal Computer Memory Card International Association (PCM-CIA) slot (not shown).

e) A hard disk drive (HDD) 190 integral to the PED, providing bulk storage for audio/video media, downloaded games, and the like.

f) A GPS receiver 420. Again the GPS receiver may share an aerial with one or more other wireless units (such as WiFi) within the PED. Map information, where used, may be stored locally at the receiver, or in flash RAM of the PED, or on an HDD of the PED.

g) One or more video cameras 240, typically each comprising a charge coupled device (CCD) optical sensor and suitable optics for imaging onto the CCD. The resolution of the CCD may for example be 640×480 pixels, but may be any suitable resolution, such as for example 1920×1080 pixels (full HD). The effective resolution may vary with frame capture rate. In an embodiment the or each video camera is integral to the PED (for example with one mounted on each of the front and rear surfaces, so providing a forward facing camera and a rearward facing camera), but alternatively may be removably connectable to the bus 130 via a USB or proprietary connection. An embodiment of the PED comprises two such video cameras 240 on one surface, thereby forming a stereoscopic pair.

In operation, the CPU accesses an operating system that is resident for example on a built-in ROM, flash RAM or a hard disk. The operating system co-ordinates operation of the various functions of the PED and presents a user interface to a user of the device. The user interface will typically comprise graphical outputs via the display and touch based inputs, but may also include audio outputs and/or motion-based inputs, and/or inputs from the various physical controls of the device.

The touch based inputs to the PED can be peculiar to the arrangement of a display on the front of the PED and a correspondingly positioned touch sensitive surface (or 'panel') on the rear of the PED. This allows the user to treat the rear panel as a proxy for the display (in other words, address actions and inputs to the rear touch panel as if to the display, and/or point on the panel in order to point to the display). Thus for example, the user can point to icons or other displayed features from apparently underneath the display by touching the rear touch panel at the corresponding position.

It will be appreciated that unlike a laptop touch panel, the rear touch panel has a substantially 1:1 scale relationship with the screen, thereby not just enabling motion of a mouse pointer on screen that corresponds to motion of touch on the panel (for example), but furthermore also enabling direct placement of such a mouse on the screen at the position corresponding to the touch on the panel, because as noted above the rear touch panel can be understood to represent the screen (i.e. act as a proxy).

Notably, because of the relative orientation of the display and the rear touch panel, left-to-right mapping across the rear touch panel is therefore reversed to correspond to left-right mapping as seen from the front, so as to allow pointing to the appropriate position on the display. Optionally this reversal is switchable depending on the orientation of the device as detected by the motion input unit, and/or according to what peripheral devices are connected; for example if the PED were connected to a television and then held display-down for use, the left-to-right mapping of the touch panel input may not be reversed.

Use of the rear touch panel as a proxy for the display advantageously allows interaction with the graphical output of the device without the user's hand or fingers obscuring the display or marking the display window.

In addition, the subjective experience of controlling the displayed interface from behind or underneath the screen allows for new modes of user interaction; for example selection, highlighting or magnification of a screen element may be achieved by a user pushing the element 'toward' them from behind the device. For a capacitance based touch panel, an increase in pressure on the rear panel (i.e. a push) can be detected by a flattening of the user's finger, which results in a larger covered area and hence more points of intersection in the panel having reduced capacitance. Conversely a reduction in pressure reduces the number of intersection points where touch is detected.

In conjunction with the similar but transparent front touch sensitive surface overlaid on the display, further modes of interaction become possible. For example, objects may be selected by being pinched between thumb and forefinger, with the thumb and forefinger touching the front and back touch panels respectively. The object may then be moved around, and, for example, activated by using a squeezing action between thumb and forefinger.

Further modes of interaction rely on the correspondence between position and/or motion of the user's fingers on the two touch panels. For example in a video playback application, stroking a finger across only the top touch panel may be interpreted as a fast-forward or rewind command (depending on direction), whilst a pinch hold followed by corresponding movement left or right of both fingers may be interpreted as selection of a specific point in playback (i.e. where the total playback time is scaled to the width of the touch panels). By contrast, however, a pinch hold followed by both fingers moving in opposite directions to each other may be interpreted as a twisting action, and adjusts a virtual volume dial. A similar grammar of interaction can be used for example for document or e-book navigation, with scrolling, page selection and zoom replacing the above playback functions.

Figure 5:
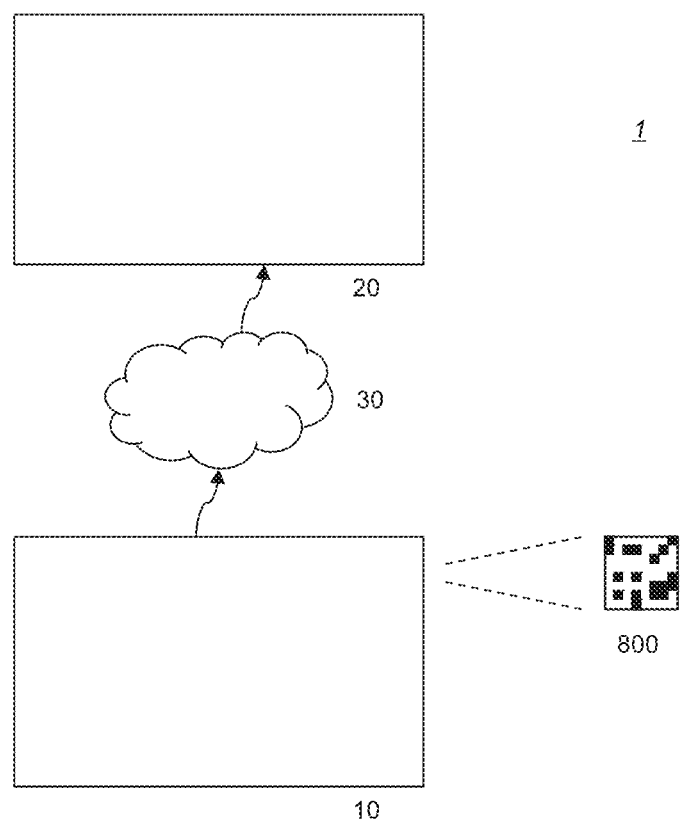
FIG. 5 is a schematic diagram of an augmented reality system in accordance with an embodiment of the present invention.

Turning now to FIG. 5, in an embodiment of the present invention, the PED 10 captures a video image of the environment (signified by the dotted lines in the figure), comprising a fiduciary marker 800 or some other predetermined real-world feature, such as a corporate logo on a shop front, or a particular person's face.

The PED compresses the video image in order to upload it via a network such as the internet 30 to a server 20 in real time within the PED's upload bandwidth limit. The server is operable to perform analysis of the image in order to identify the fiduciary marker, predetermined real-world feature or particular face (hereafter collectively referred to as a marker). This allows the computationally heavy task of recognition to be performed remotely for a real-time video sequence from the PED.

However, recognition using a heavily compressed video image is likely to be poor, or have low fidelity; for example, the approximate location of the marker may be discernible, but the orientation may have a large error margin.

Consequently, in an embodiment of the present invention the server sends to the PED co-ordinates identifying a predicted region in which the next captured video image should be less compressed, or not compressed at all. This predicted region is the area of the next image that the server calculates will comprise the marker. The format of the co-ordinates may for example stipulate diametric pixel positions of a square region, or a central pixel position and a radius of a circular or oval region. Other formats will be apparent to the skilled person.

Initially, the predicted region is likely to be the estimated position of the marker in the current image frame, but optionally over successive frames the relative motion of the marker in the video sequence may be predicted using known techniques such as optical flow and/or Kalman filtering, in order to better predict the updated position of the marker in the next video frame.

In addition to and optionally separately from the region co-ordinates, the server also sends parameter data descriptive of the required augmentation.

This parameter data will depend on the nature of the augmentation, but may variously comprise:
  2D co-ordinates, scaling and/or rotational information for a 2D augmentation (i.e. a sprite overlay); and/or
  3D co-ordinates and orientation information for the PED to render locally, so determining the effective 2D position, scaling and orientation required, and/or
  2D or 3D co-ordinates, scaling and/or rotational information for a 3D virtual object used in augmentation, optionally so that the PED only has to render the particular object without maintaining an internal representation of a 3D world; and/or
  Pose information for an articulated virtual object, such as a game character; and/or
  Differential/incremental data relating to any of the above to indicate a change from a previously established position or pose.

Typically, this data will be associated with a virtual asset ID, indicating which virtual object or group of objects this parameter data applies to. Clearly, the server may send parameter data relating to one or more assets.

The PED then renders the indicated virtual asset or assets accordingly and superposes them on the captured video image.

Notably therefore, the PED is potentially able to display complex augmented reality images in real time, by using the processing power of the server to perform the image analysis and tracking tasks and to calculate virtual asset positioning.

Also notably, the PED's required data upload bandwidth is advantageously reduced because the server identifies a region of the next video image in which it calculates the marker will be present, and the majority of the upload bandwidth can be assigned to this region, so that the image will be clearest in this region.

The server may specify the region in a manner that further reduces the computational load on the PED, such as for example expanding or adapting it to exactly fit a set of macroblocks used in the video compression algorithm, so that this step can be omitted from the PED.

Figure 6:
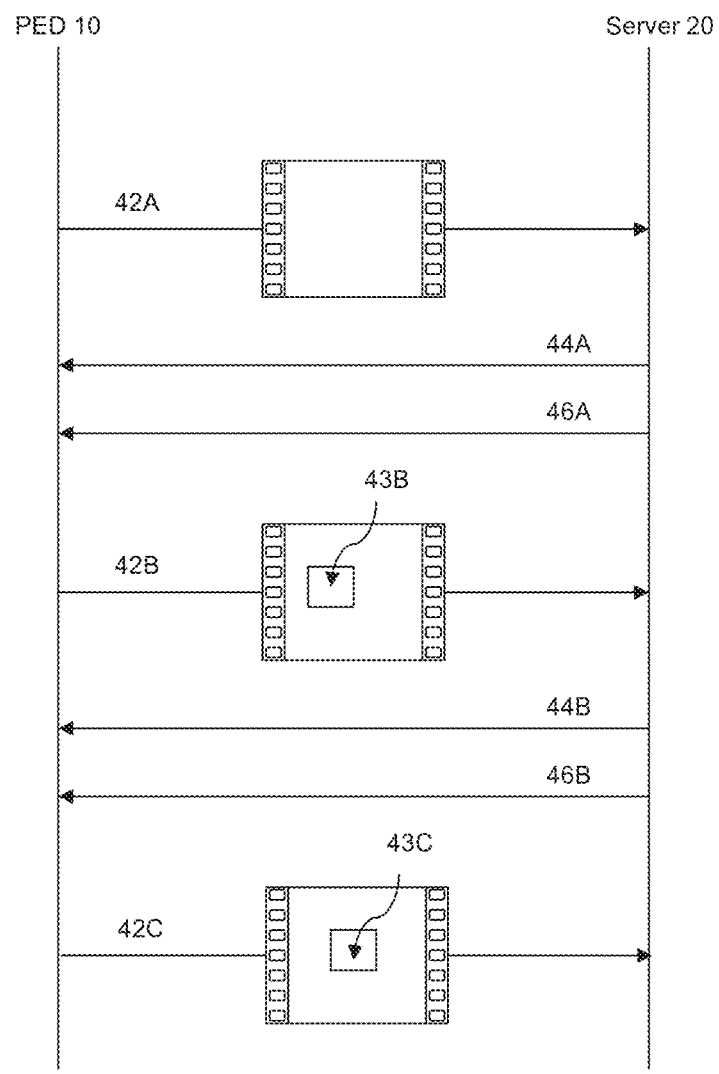
FIG. 6 is a schematic diagram of communications between a portable electronic device and a server in accordance with an embodiment of the present invention.

The above process is summarised in FIG. 6 as follows.

Initially, the PED 10 sends a video image 42A that is uniformly compressed (or compressed according to various initialisation strategies discussed herein below). The server receives this image and analyses it, identifying the location of a marker in the image. The server sends back augmentation data 44A as described above, and also region identification data 46A for the next video frame as described above. In response to the augmentation data, the PED augments the locally stored version of the captured video image 42A and displays it to the user. The PED then compresses the next captured video image 42B, with a region of the image 43B corresponding to the region identification data being compressed less or not at all, so that the server can analyse the region of the image predicted to contain the marker with more precision. The server sends back augmentation data 44B and region identification data 46B for the next video frame. The region identification data may make use of any detected motion in the video images received so far to predict the position of the marker in the next frame, as described previously. As a result the PED augments the locally stored version of the captured video image 44B and displays it, and also compresses the next captured video image 42C, with a region of the image 43C corresponding to the region identification data being potentially different to that of the region 43B of image 42B.

In addition to the compressed video data described herein, if the PED comprises motion detection means such as accelerometers, gyroscopes, GPS or magnetometers, or implements optical flow analysis as an ongoing activity, then parameters from any or all of these motion detection means may also be transmitted to the server, either with the video or separately, so that the server can use the motion information to predict an expected change in the position of a marker in a captured image due to the motion. Similarly if the PED's camera comprises a zoom function, then the current zoom value or a differential change in zoom value may be transmitted to notify the server of a likely change in the size of the marker.

It will be appreciated that occasionally the position of the marker may be lost (for example due to occlusion) and similarly the marker's initial position in at least the first uploaded video frame is not immediately known. Consequently the server may not be able to send region identification data to the PED.

In these circumstances, various initialising or re-initialising techniques may be employed.

Hence in an embodiment of the present invention, where the server has not yet sent region information (for example for the first video frame), or the region information has a low confidence value, or a warning flag or other indicator of recognition loss is associated with it, then the PED may revert to distributing upload bandwidth over the whole of the video image.

In this case therefore the whole image may be uniformly compressed and sent to the server, so that all areas of the image may be amenable to recognition.

Alternatively or in addition (for example if the above strategy does not work after a predetermined number of frames), the PED may send video frames in which successive search regions of the video image are less compressed as if they contained the marker, whilst the remainder of the image is more compressed, in the manner described previously herein.

The successive regions may be overlapping or non-overlapping, but over the course of a plurality of frames they progress over substantially the whole of the video frame area. In this way a low-compression search window is passed over the captured scene, thereby potentially relaying an image of the fiduciary marker at an adequate quality to the server in at least one frame, and enabling the server to (re)start sending predicted region co-ordinates back to the PED.

Alternatively or in addition the PED itself may implement some image processing, particularly if one or more of the above strategies fail after a predetermined number of frames. In this case, the PED may compute a difference image from the captured image. For example, the R, G, and B values or greyscale value differences between neighbouring pixels. A low computation version of this process compares the difference between a current pixel and one immediately neighbouring pixel, such as the pixel to the right or a pixel offset vertically and horizontally by one pixel (i.e. touching at corners), for each pixel in the image. A more reliable but higher computation version of this process compares the difference between a current pixel and a plurality of neighbouring pixels (up to eight) and selects the largest difference value, or some function of one or more of the calculated difference values.

This approach will serve to highlight high-contrast patterns from the video image in the difference image. Regions of the image with a comparatively high density of high-difference values may then be subject to less compression than regions of the image with a low density of high-difference values. For example, each macroblock may be assessed based on the top N difference values in that macro block, and the M macroblocks with the highest N difference values are not compressed, or are compressed less than other macroblocks. The threshold defining 'high difference' may be dynamically adjusted until the compressed image fits a desired data size.

In addition, for markers other than faces it may be assumed that the marker is static in the environment, at least in the short term. Hence when the marker had previously been located and is now lost, then as noted above use of optical flow analysis and/or internal accelerometer, gyroscopic, GPS and/or compass motion sensors may be used to estimate where the marker is in the current video frame, and this may be used to reduce the compression in that region of the video frame as described previously.

It will be appreciated that the video frame rate will typically be 30 frames per second (or 25 or 24 frames per second if adhering to various different video frame rate conventions).

Hence if the system is to provide a real-time, frame-by-frame analysis and augmentation of the PED's video, then only a sub-frame or one-frame delay is preferable in order to provide responsive augmentation.

Whilst the video compression on the PED, and (assuming sufficient processing power) the analysis by the server may both be done within $1/30^{th}$ of a second (i.e. within a frame period), the communication path between the PED and the server may be slower and time-variable.

Clearly if the communications round trip is short enough in duration then frame-by-frame analysis and augmentation is possible.

However, if a video frame period is in the order of 0.03 to 0.04 seconds, then a typical ping of 20 ms from the PED to the server and a similar return, together with the upload time for the video data, mean that the round-trip for augmentation data may be longer than a single video frame.

In a first case, assuming that the round trip is longer than a single video frame and the upload time for the video data is less than one video frame period, then this creates an offset delay that means the PED would not receive data from the server in time for the current video image.

Consequently in an embodiment of the present invention, the PED itself predicts the predicted region of the next image using historical information, such as the last P received predicted regions from the server (for example corresponding to the prediction made for the current image for the last image, and so on back through P prior images). The position of the predicted region can be extrapolated from this sequence and used to compress the next video frame for upload. When the next predicted region is received the server, it is added to the top of this historical sequence.

Similarly, the PED may predict the position and orientation of the graphical objects used to augment the previous video frame, again using gross motion estimation methods such as optical flow and motion sensor data, and also any animation sequence data held by the PED.

Alternatively or in addition, the server may make these predictions for the next video frame to be captured by the PED after receipt of the server's data is expected at the PED. In other words, the server performs predictions based on the older video frames it has already received, for the currently captured video frame in the PED, so that the PED still gets an indication of the region of that image to compress less, and instructions for augmentation of that image. This has the advantage of removing the computational burden from the PED but has the disadvantage that it relies upon the download from the server to the PED also occurring within a particular duration.

Hence in an embodiment of the present invention, the server provides these predictions, but the PED also stores the necessary historical data to perform the predictions itself if the data has not been received from the server after a threshold time within the frame-by-frame video cycle after which it would be difficult for the PED itself to perform the calculations in time either to compress and upload the current captured image or to augment and display it.

It will also be understood that the displayed video image can probably be subject to a one-frame delay without adverse subjective effects on the user, thereby providing a longer delay period in which to send/receive data from the server before the above local or remote prediction strategies become necessary.

Meanwhile in a second case, if the upload time for the video data itself is greater than one video frame period, then the result is a cumulative delay that would eventually be unsustainable.

In this case, the problem may be addressed by greater compression to reduce upload times. However this carries the risk of making the marker harder to identify. Another approach is to upload fewer video frames. For example if the video takes 1.5 frame periods to upload, then only alternate video frames are uploaded.

Notably in this case, the compression of the video image could be reduced until uploading of (the more detailed and larger byte size) video image took for example 1.9 frame periods, since this time is otherwise unused. An adaptive codec such as h264 could be used so that successive refinement layers could continue to be sent until the system ran out of time (e.g. at 2 frame periods), thus maximising the possible uploaded image quality in an adaptive manner on an image-by-image basis and improving the chances and potential accuracy of recognition.

Like the fixed delay example above, this alternate frame uploading video scheme also means that the PED may not receive data for the current video image from the sever.

Consequently again the PED may extrapolate a predicted region for the next transmitted captured video frame, and estimate augmentation positions for graphical objects for the current and next displayed video frames, updating the basis for these extrapolations and estimations as the latest data from the server is received.

Alternatively again the server may transmit predicted regions to the PED on a per frame basis, using potentially more accurate but processor intensive extrapolations calculated on the server side, and separately also transmit estimated augmentation data for on a per frame basis, updating the basis for these extrapolations and estimations as the latest data from the PED is received.

It will be appreciated that the PED and server may move between communication states depending on current signal conditions. Hence the system may enjoy sub-frame period round trip communications when the PED is located close to a wi-fi router and use frame-by-frame communication, but may switch to a fixed delay scheme if the signal strength drops with an associated drop in bandwidth and transmission speed, or to an alternating frame scheme if the signal strength and transmission speed drops further.

Hence optionally the server and/or the PED maintain the historical information needed to switch to any of the schemes independent of the current scheme being used.

Hence it will be understood that the PED sends to the server compressed video data with a region thereof subject to less or no compression that is predicted to contain the marker. When the upload and acknowledgement time is less than a frame period, the PED can use information from the server on a frame-by-frame basis to position augmented graphics and select the next video region for reduced or no compression. In other circumstances, it may be necessary for the PED or the server or a combination of both to predict augmentation and/or image regions for one or more additional video frames, updating the basis for such predictions as new video frames are uploaded and analysed.

The above system therefore moves the image processing burden wholly or mainly on to the server when possible, enabling the use of so-called 'thin' clients with comparatively little processing power or memory, such as smart phones, portable games consoles and the like.

The remote analysis of the video image also means that the memory requirement for marker recognition is advantageously displaced to the server. This means that the PED (by virtue of the server) can potentially recognise a very large number of markers.

For example, the server may be linked to or part of a social media system, and use previously tagged faces of users in the social media system as markers. The user could then point their PED at a person and receive an augmented image showing that person's publically available profile data.

In a similar manner, corporate logos and unique features for various locations may be set as markers and recognised by the server, so that relevant augmentations are presented by the PED at these locations. Additional graphics, animations and such like can be downloaded as a background activity in response the PED's general location, even if the AR function is not currently active. In this way, the PED can appear to have a seemingly endless augmented reality capability that can be used in a variety of locations and for a variety of uses. To assist with this process, the PED may upload its position as determined by GPS to the server, and/or the server may receive base-station/cell location information if the PED is using the mobile 'phone system.

Hence in a summary embodiment of the present invention, a portable electronic device (10) such as a PS Vita or a smartphone comprises a video camera (240) for capturing a sequence of video images, and an image processor (e.g. the CPU 100, GPU 220, or a combination of the two) operable to compress a first region of a current video image to a first extent and a second region of the video image (for example the remainder of the video image, or the remaining active region, for example if there is a letterbox border) to a second, greater, extent to generate a processed video image. Typically the first extent may simply be a standard recording quality compression generated by the device when recording video locally, with the second extent being that necessary to accommodate the whole video image (including the first region) within a predetermined bandwidth. It will be appreciated that the first extent of compression may increase as necessary but will remain less than the second extent.

The PED also comprises a network communications interface (140, 150) operable to send processed video images to a server (20), and to receive control data from the server. In addition, the image processor is operable to augment a video image with one or more computer graphic elements, as described previously.

Also as described previously, control data received from the server comprises image region information indicating a region of a video image estimated to comprise an augmented reality marker (e.g. a predetermined marker such as a fiduciary marker, face, corporate logo, road marking or sign, landmark or similar), and the image processor is operable to define the first region of the current video image responsive to the image region information from the server. As described above, depending on any round-trip delays, the image region information may be directly related to the current video image (e.g. predicted by the server from a previous video image) or may relate to a previous video image, and require further prediction from the PED.

Hence in an instance of the summary embodiment, the received image region information relates to a current video image and indicates a region of the current video image estimated to comprise an augmented reality marker, and the portable electronic device uses the region indicated by the image region information as the first region when compressing the current video image.

Meanwhile in an alternative instance of the summary embodiment, the received image region information relates to a preceding video image and indicates a region of the preceding video image estimated to comprise an augmented reality marker, and the portable electronic device maintains a history of such image region information from which a first region of the current video image is computed, as described previously.

Similarly control data from the server may comprise one or more augmentation instructions for use by the PED locally, but again these may relate to the current video image or a preceding video image. It will be understood that the region information and the augmentation instructions may be sent separately in multi-part control data, or together.

Hence in an instance of the summary embodiment, the control data comprises one or more augmentation instructions for augmentation of the current video image with one or more computer graphic elements by the image processor.

Meanwhile in an alternative instance of the summary embodiment, the control data comprises one or more augmentation instructions for augmentation of a preceding video image, and the portable electronic device maintains a history of such augmentation instructions from which instructions for augmentation of the current video image with one or more computer graphic elements by the image processor are computed, as described previously.

As noted previously, for the first video image and if there is a severe delay or interruption to communications from the server to the PED, then the PED may not have direct region information for the current video image.

Hence in an instance of the summary embodiment, if control data comprising image region information has not been received from the server, or was last received from the server in respect of a preceding video frame more than a predetermined threshold number of video frames old, then the portable electronic device is operable to implement one or more techniques as applicable selected from the list consisting of:

i. compress the whole of the current video image to a substantially uniform extent, as described previously;
ii. use a default sequence of first region positions for successive video images until image region information is received from the server (as described above, thereby performing a blind search across the scene region by region);
iii. estimate the first region from historical values of the first region for preceding video frames (for example by using historical information and a prediction method such as a Kalman filter); and
iv. perform an analysis of the current video image to estimate the location of the marker in the video image (this may be a simple contrast-based analysis as described previously, or may be a more complete analysis similar to that implemented by the server, temporarily using more computing resources and power from the PED).

In an instance of the summary embodiment, for example where uploading the processed video images takes longer than the period of the video frame rate, the portable electronic device only processes a periodically spaced subset of captured video images and sends them to the server. Typically the period is 2 (i.e. every other video image), but if upload speeds are particularly slow, the period may be 3, 4, etc., and the upper limit on the period depends upon the usability of the resulting predictions. This in turn may be gauged from whether there is much apparent motion in successive images (for example if the PED is static, then it may be possible to use a sample period of 10 or 20 frames). Hence the server may also send instructions to the PED to dynamically change the sampling period in response to the nature of the video sequence being received, in order to reduce upload data where possible.

Turning to the server, in the summary embodiment of the present invention, a server 20 for an augmented reality system 1 comprises a network communications interface (not shown, but for example an Ethernet link) operable to receive processed video images from a portable electronic device, and to send control data to the portable electronic device, and an image processor (not shown, but typically one or more CPUs of the server) operable to identify the position of an augmented reality marker in a received processed video image that has been compressed in a first region to a first extent and in a second region of the video image to a second, greater, extent, as described above. The image processor is operable to generate image region information indicating a first region estimated to comprise the augmented reality marker for a subsequent video image, responsive to the identified position of the augmented reality marker in the received processed video image. The control data sent by the server comprises the generated image region information.

It will be appreciated that the server may be a stand-alone server, a cluster of servers, or one or more real and/or virtualised servers in a cloud system.

In an instance of the summary embodiment, the server generates image region information indicating a first region estimated to comprise the augmented reality marker for a video image two or more frames subsequent to the processed current video image. Hence for example the server may compare a launch timestamp associated with the received processed video frame with the reception time at the server to determine the transmission delay. The server attempts to generate image region information for the video frame currently being captured and about to be transmitted to the server by the PED. Hence if the received processed video frame is less than one video frame period old, the server can extrapolate directly to the next image to provide the desired image region information. However if due to the delay the received processed video frame is more than one video frame period old, the server will have to extrapolate by two or more video frame periods to predict the image region for the currently captured video image of the PED. Clearly this also applies where the PED is sending a periodically spaced subset of captured video images.

In the summary embodiment of the present invention an augmented reality system 1 comprises an embodiment of the PED 10 as described herein suitably combined with an embodiment of the server 20 as described herein. Optionally where the marker is not a face, logo, or landmark but rather a fiduciary marker, then the system may also comprise one or more of such fiduciary markers.

Figure 7:
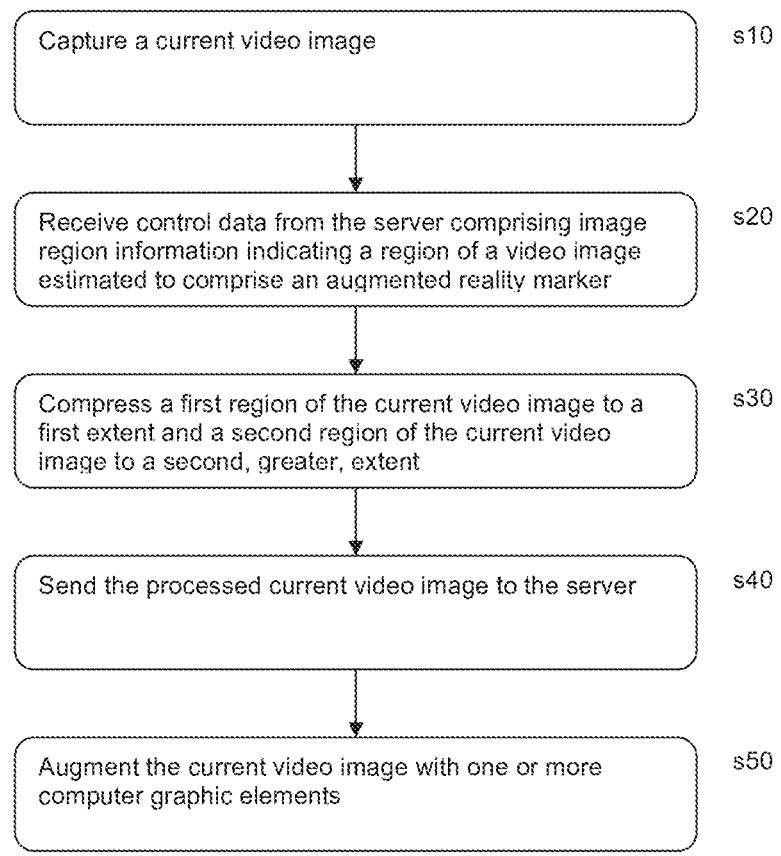
FIG. 7 is a flow diagram of a method of augmented reality for a portable electronic device in accordance with an embodiment of the present invention.

Referring now to FIG. 7, a method of augmenting a video image for a portable electronic device comprises:
In a first step s10, capturing a current video image;
In a second step s20, receiving control data from the server comprising image region information indicating a region of a video image estimated to comprise an augmented reality marker;
In a third step s30, compressing a first region of the current video image to a first extent and a second region of the current video image to a second, greater, extent to generate a processed current video image;
In a fourth step s40, sending the processed current video image to the server;
In a fifth step s50, augmenting the current video image with one or more computer graphic elements;
and in which the first region of the current video image is defined responsive to the image region information received from the server.

It will be apparent to a person skilled in the art that variations in the above method corresponding to operation of the various embodiments of the PED as described and claimed herein are considered within the scope of the present invention, including but not limited to:
the control data comprising one or more augmentation instructions for augmentation of the current video image with one or more computer graphic elements by the image processor; and
if control data comprising image region information has not been received from the server, or was last received from the server in respect of a preceding video frame more than a predetermined threshold number of video frames old, then one or more steps as applicable is selected from the list consisting of:

i. compressing the whole of the current video image to a substantially uniform extent;
ii. using a default sequence of first region positions for successive video images until image region information is received from the server;
iii. estimating the first region from historical values of the first region for preceding video frames; and
iv. performing an analysis of the current video image to estimate the location of the marker in the video image.

Figure 8:
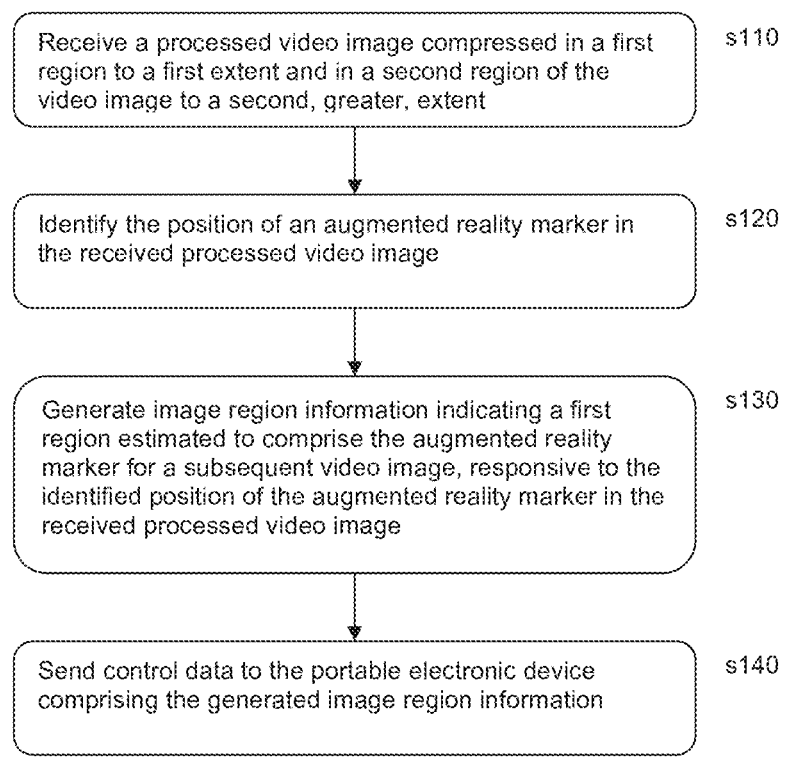
FIG. 8 is a flow diagram of a method of augmented reality for a server in accordance with an embodiment of the present invention.

Referring now to FIG. 8, a method of augmenting a video image for a server comprises:

In a first step s110, receiving a processed video image that has been compressed in a first region to a first extent and in a second region of the video image to a second, greater, extent, from a portable electronic device;

In a second step s120, identifying the position of an augmented reality marker in the received processed video image;

In a third step s130, generating image region information indicating a first region estimated to comprise the augmented reality marker for a subsequent video image, responsive to the identified position of the augmented reality marker in the received processed video image; and In a forth step s140, sending control data to the portable electronic device comprising the generated image region information.

It will be apparent to a person skilled in the art that variations in the above method corresponding to operation of the various embodiments of the server as described and claimed herein are considered within the scope of the present invention.

It will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, if applicable the computer program may take the form of a transmission via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A portable electronic device, comprising:
a video camera for capturing a sequence of video images;
an image processor operable to compress a first region of a current video image to a first extent and a second region of the current video image to a second, greater, extent to generate a processed current video image;
a network communications interface operable to send processed video images to a server, and to receive control data from the server; and
the image processor is operable to augment the current video image with one or more computer graphic elements; and in which
the control data received from the server comprises image region information indicating a predicted region of a next video image in the sequence of video images estimated to comprise a predetermined marker, wherein indication of the predicted region is based on an earlier processed video image previously sent from the portable electronic device to the server; and
the image processor is operable to define the first region of the current video image responsive to the image region information from the server;
wherein the earlier processed video image was previously sent from the portable electronic device to the server according to an initialization compression strategy, and the image processor is configured, according to the received control data, to change from the initialization compression strategy to a partial compression strategy in which the first region of the current video image is compressed to the first extent and the second region of the current video image to a second, greater, extent to generate the processed current video image and to subsequently send the processed current video image to the server.

2. A portable electronic device according to claim 1, in which the received image region information relates to the current video image and indicates a region of the current video image estimated to comprise a predetermined reality marker, and the portable electronic device uses the region indicated by the image region information as the first region when compressing the next video image.

3. A portable electronic device according to claim 1, in which the received image region information relates to a preceding video image and indicates a region of said preceding video image estimated to comprise a predetermined marker, and the portable electronic device maintains a history of such image region information from which the first region of the current video image is computed.

4. A portable electronic device according to claim 1 in which the control data comprises one or more augmentation instructions for augmentation of the current video image with one or more computer graphic elements by the image processor.

5. A portable electronic device according to claim 1 in which the control data comprises one or more augmentation instructions for augmentation of a preceding video image, and the portable electronic device maintains a history of such augmentation instructions from which instructions for augmentation of the current video image with one or more computer graphic elements by the image processor are computed.

6. A portable electronic device according to claim 1, in which if control data comprising image region information has not been received from the server, or was last received from the server in respect of a preceding video frame more than a predetermined threshold number of video frames old, then the portable electronic device is operable to implement one or more as applicable selected from the list consisting of:
i. compress the whole of the current video image to a substantially uniform extent;

ii. use a default sequence of first region positions for successive video images until the image region information is received from the server;

iii. estimate the first region responsive to historical values of the first region for preceding video frames; and iv. perform an analysis of the current video image to estimate the location of the predetermined marker in the video image.

7. A portable electronic device according to claim 1 in which the portable electronic device only processes a periodically spaced subset of captured video images and sends them to the server.

8. A method of augmented reality for a portable electronic device, comprising the steps of:

capturing a current video image;

receiving control data from a server, the control data comprising image region information indicating a predicted region of a next video image in a sequence of video images estimated to comprise a predetermined marker, wherein indication of the predicted region is based on an earlier processed video image previously sent from the portable electronic device to the server, wherein the earlier processed video image was previously sent from the portable electronic device to the server according to an initialization compression strategy;

compressing a first region of the current video image to a first extent and a second region of the current video image to a second, greater, extent to generate a processed current video image, the compressing being performed according to the received control data, including changing from the initialization compression strategy to a partial compression strategy in which the first region of the current video image is compressed to the first extent and the second region of the current video image to a second, greater, extent;

sending the processed current video image to the server; and augmenting the current video image with one or more computer graphic elements;

and in which the first region of the current video image is defined responsive to the image region information received from the server.

9. The method of claim 8, in which the control data comprises one or more augmentation instructions for augmentation of the current video image with one or more computer graphic elements by the image processor.

10. The method of claim 8, in which if control data comprising image region information has not been received from the server, or was last received from the server in respect of a preceding video frame more than a predetermined threshold number of video frames old, then one or more steps as applicable is selected from the list consisting of:

i. compressing the whole of the current video image to a substantially uniform extent;

ii. using a default sequence of first region positions for successive video images until the image region information is received from the server;

iii. estimating the first region responsive to historical values of the first region for preceding video frames; and iv. performing an analysis of the current video image to estimate the location of the predetermined marker in the video image.

11. A non-transitory computer program product storing computer implementable instructions thereon, the instructions, when run, causing a computer to implement a method of augmented reality for a portable electronic device, comprising the steps of:

capturing a current video image;

receiving control data from a server, the control data comprising image region information indicating a predicted region of a next video image in a sequence of video images estimated to comprise a predetermined marker, wherein indication of the predicted region is based on an earlier processed video image previously sent from the portable electronic device to the server, wherein the earlier processed video image was previously sent from the portable electronic device to the server according to an initialization compression strategy;

compressing a first region of the current video image to a first extent and a second region of the current video image to a second, greater, extent to generate a processed current video image, the compressing being performed according to the received control data, including changing from the initialization compression strategy to a partial compression strategy in which the first region of the current video image is compressed to the first extent and the second region of the current video image to a second, greater, extent;

sending the processed current video image to the server; and augmenting the current video image with one or more computer graphic elements;

and in which the first region of the current video image is defined responsive to the image region information received from the server.

* * * * *